United States Patent [19]

Gleason

[11] Patent Number: 4,964,939
[45] Date of Patent: Oct. 23, 1990

[54] LABELING METHOD EMPLOYING STARCH-BASED ADHESIVE FORMULATION CONTAINING ROSIN COMPOSITION

[75] Inventor: Patrick D. Gleason, St. Paul, Minn.

[73] Assignee: H. B. Fuller Company, St. Paul, Minn.

[21] Appl. No.: 239,527

[22] Filed: Aug. 31, 1988

Related U.S. Application Data

[62] Division of Ser. No. 129,176, Dec. 7, 1987, Pat. No. 4,804,414.

[51] Int. Cl.$^5$ .................................. C09J 3/02
[52] U.S. Cl. ...................... 156/336; 40/310; 106/211; 106/212; 156/155; 156/344
[58] Field of Search ............. 156/336, 344, 155; 40/310; 106/211, 212

[56] References Cited

U.S. PATENT DOCUMENTS

| | | |
|---|---|---|
| 1,311,965 | 8/1919 | Grosvenor . |
| 2,477,912 | 8/1949 | Vallandigham . |
| 2,613,168 | 10/1952 | Totten .................................. 40/310 |
| 2,654,171 | 10/1953 | Nestor .................................. 40/310 |
| 2,813,093 | 11/1957 | Caldwell et al. . |
| 2,943,071 | 6/1960 | Laden . |
| 3,346,563 | 10/1987 | Shildneck et al. . |
| 3,408,214 | 10/1968 | Mentzer . |
| 3,444,109 | 5/1969 | Golick et al. ........................ 156/328 |
| 3,582,464 | 6/1971 | Aldrich . |
| 3,692,713 | 9/1972 | Columbus et al. . |
| 3,939,108 | 2/1976 | Sirota et al. . |
| 4,440,884 | 4/1984 | Jannusch ............................ 156/336 |
| 4,642,196 | 2/1987 | Yan . |

FOREIGN PATENT DOCUMENTS 1087544 of 0000 U.S.S.R. .

OTHER PUBLICATIONS

Hercules Technical Information (Sheet) No. 7247-3.
Kirk-Othmer Encyclopedia of Chemical Technology, Second Edition, vol. 11, pp. 242-262, and vol. 17, pp. 475-508.
Hercules Product Data Bulletin, No. 7225-8.
NL Chemicals Technical Bulletin Bentone EW.
Vistron Corporation Specification Sheet.
Hercules Product Data Bulletin No. 712-3 Staybelite.
Diamond Shamrock Product Bulletin Foamaster VF.
Mallinckrodt Material Safety Data Sheet.
Thiokol/Ventron Division Data Sheet, Cuniphen Ⓡ 2778-1.
U.S. Department of Labor Material Safety Data Sheet-Sodium Tetraborate Pentahydrate.
U.S. Department of Labor Material Safety Data Sheet-Dicyandiamide.
A. E. Staley Manufacturing Company Material Safety Data Sheet.
Hercules Development Data POLYSTIX 90.
Diamond Shamrock Technical Bulletin.
Chemical Abstracts, vol. 108: 57437a, "Preparation of Adhesives for Labels".
Chemical Abstracts, vol. 101: 56789k, "Adhesive".

*Primary Examiner*—John J. Gallagher
*Attorney, Agent, or Firm*—Merchant, Gould, Smith, Edell, Welter & Schmidt

[57] ABSTRACT

Aqueous starch-based adhesives for use in a variety of applications can be made alkali sensitive or can have enhanced cleanability under aqueous conditions.

23 Claims, No Drawings

LABELING METHOD EMPLOYING STARCH-BASED ADHESIVE FORMULATION CONTAINING ROSIN COMPOSITION

This is a division, of application Ser. No. 07/129,176, filed Dec. 7, 1987, now U.S. Pat. No. 4,804,414.

FIELD OF THE INVENTION

The invention relates to aqueous starch-based adhesive formulations that can be used in a variety of applications such as in an envelope adhesive, a label adhesive and other applications. More particularly, the invention relates to an aqueous starch-based adhesive that is formulated with components that increase the aqueous cleanability and more particularly the aqueous alkali sensitivity of the adhesive.

BACKGROUND OF THE INVENTION

Aqueous adhesive natural product ingredients are used for blending in certain aqueous adhesive formulae. For example, animal protein, casein, and starch have been used in a variety of applications including as envelope gums, corrugating board adhesives, label adhesives, and other applications. One class of adhesives using a natural product is the casein-based adhesive that is currently a leading class of labeling adhesive and is also used in other end uses. Casein adhesives possess a spectrum of beneficial properties useful in labeling applications including machinability, bond strength, and water resistance. Of these properties, water resistance can be very beneficial. Casein based adhesives can resist the action of water for 24 or more hours.

Another class of adhesive is the starch-based adhesive. One primary end use for starch-based adhesives discussed above is in the application of labels to beverage containers. In applying labels to beverage containers, high speed machines are used which transfer adhesive films while wet to pallets which then pick labels from label stacks and then transfer the adhesive to the label. Once coated with adhesive the label is contacted with the container for permanent adhesion. In the labeling process, when labels are adhesive coated and transferred from a stack to a bottle, many adhesive formulations tend not to have sufficient adhesive strength to adhere the adhesive film to the pallet or to the bottle during the transfer processes. Also certain adhesive compositions lack a property called "shortness" which relates to the resistance of the adhesive to forming long string-like portions of adhesive that can be created as the labeling machine transfers the wet label from place to place in the machine. Such "cobweb" or "angel hair" material while wasteful can also reduce the quality of the adhesive bond and can cause significant machine and processing difficulties because of the introduction of the angel hair into the machine.

(Beverage bottles) have been labeled with starch based adhesives for many years. However the use of starch and its derivatives in label adhesives can pose a significant problem when returnable beverage bottles are cleaned prior to refilling. Typically bottlers contact returned bottles with dilute hot caustic solutions to remove labels, disinfect and clean the bottles. Labels bonded with starch-based adhesives can resist removal under these conditions and can cause significant increases in costs of using returnable bottles. Casein-based adhesives are typically adequately cleaned by aqueous caustic.

One attempt in making a water resistant but alkali removable casein substitute in a starch-based adhesive is shown in Sirrota, U.S. Pat. No. 3,939,108 which teaches an adhesive that is combined with a styrene-maleic anhydride copolymer. Such an adhesive appears to have some utility in labeling beverage bottles, but has not achieved significant commercial impact to date.

As is the case with many natural product ingredients, the supply and pricing of casein has the potential for causing disruption in the availability of water resistant labeling adhesives. Casein has a variety of end uses and depending on demand casein can be in very short supply and can be available only at increased prices. A non-casein substitute labeling adhesive having the properties of casein-based aqueous dispersions that is formed from available natural and synthetic ingredients is a desirable goal.

Accordingly, a substantial need exists for developing new adhesive formulations and to develop a replacement formulation for casein-based adhesives. Further a need exists to improve starch-based adhesives that generally lend themselves to rapid and effective aqueous cleanability and particularly to selective aqueous or aqueous alkali cleanability.

BRIEF DISCUSSION OF THE INVENTION

We have surprisingly found that aqueous starch-based adhesives comprising a major proportion of water, an effective adhesive bond-promoting amount of starch, and a (water soluble neutralized reaction product between a base and a rosin composition) having an acid number of greater than about 140 can be used as a general purpose adhesive. Such an adhesive can form adhesive bonds between a large variety of bonded surfaces in many end uses. Further, the use of such formulations can significantly improve the aqueous cleanability of the adhesive materials from manufacturing equipment, application equipment, and end uses. The rosin having a high acid number due to the presence of pendent carboxylic acid groups cooperates with the starch and other ingredients in adhesive formulations to provide strong adhesive bonds that can be cleaned with aqueous cleaners and in certain cases an alkali solution. More particularly, we have surprisingly found that the aqueous starch-based adhesives containing the water soluble neutralized reaction product between a base and an acid rosin composition can be used in bottle labeling end uses as a direct replacement for casein-based adhesives. We have found that appropriate formulations of starch and the reaction product between a base and the acid rosin duplicate the bonding shortness and other machining properties of casein-based adhesives, while additionally (duplicating their water resistance/alkali or aqueous cleanability.)

Acid rosins such as wood rosins and hydrocarbon rosins, in their native state, are water insoluble but are known to be compatible in nonaqueous hot melt preparations with such ingredients as thermoplastic polymers, plasticizing and tackifying oils, and other resinous materials. The use of the rosin in the water-based adhesives of the invention add properties we have discovered that relate to the removability of the adhesives with aqueous cleaning solutions and more particularly with dilute alkali. Such preparations are surprising in view of the well known water insolubility of rosin and its common use in hot melt adhesive materials.

We have further learned that the choice of base in neutralizing the acid resin can have a significant effect on the properties of the adhesive compositions. Adhesive compositions containing a rosin neutralized with an alkali metal hydroxide base is significantly more easily cleaned with aqueous cleaners than comparable starch-based adhesives lacking the neutralized rosin. The adhesive compositions of the invention made by neutralizing the (carboxylic acid containing rosin) with a volatile amine base or a volatile basic ammonia compound is water resistant but is particularly sensitive to removal through the use of aqueous caustic such as that used in cleaning returnable bottles in the beverage industry.

We have found that the starch-based neutralized rosin adhesives of this invention have significant advantages. We have found that the rheological properties of the starch-based adhesives are significantly improved when compared to the casein-based adhesives. At the same viscosities, the adhesives of the invention have increased tack and can be run at increased machine speeds. The starch neutralized rosin adhesives of the invention have improved shortness and resistance to shear at machine conditions. Further, we have found that the stability of the adhesive at room temperature has increased resulting in a storage stable adhesive. The storage stability is improved in conditions of low, moderate and high shear. Lastly, we have found that the adhesives of the invention when made of the alkali metal or alkaline earth metal bases have low odor.

The terms "base" and "basic" are intended to refer to compounds that when dissolved in aqueous solution at a concentration of about 0.1 N have a pH of >7.

DETAILED DESCRIPTION OF THE INVENTION

The adhesive compositions of this invention comprise aqueous adhesives containing a major proportion of water, an effective amount of starch, and the neutralization reaction product of a base and rosin having an acid number of greater than about 140, such as a wood rosin or a hydrocarbon rosin having pendent carboxyl groups.

Base

Bases that can be used in the instant invention to neutralize and solubilize the rosin component of the invention can be drawn from two general classes. Each of the classes have special and unique properties that are obtained from the interaction between the base, the rosin and the adhesive composition. A first class of base comprises an alkali metal base or alkaline earth metal base which in aqueous solution can neutralize the acidic moiety in an acidic rosin composition. Such basic compositions include bases derived from alkali metals and alkaline earth metals such as sodium, potassium, magnesium, calcium, and other basic metal compounds. Exemplary compounds include sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, sodium pyrophosphate, and others. Typical properties for the alkali metal and alkaline earth metal bases of this invention involve at least some water solubility, a pH greater than 7 in a water solutions of the base, and sufficient reactivity to neutralize the acidic rosins of the invention. Such bases when used to neutralize the acidic rosins of the invention provide starch based adhesives that are readily dissolved in neutral, acidic or basic aqueous cleaners A second class of bases useful in preparing the adhesives of this invention include volatile nitrogen bases. Such bases include basically reacting compounds, preferably from nitrogen, that can be volatilized through the action of heat or upon exposure to ambient atmosphere. Such bases include ammonia, ammonium hydroxide, methylamine, dimethylamine, triethylamine, ethylamine, diethylamine, triethylamine, ethanolamine, dimethylethanolamine, diethanolamine, triethanolamine, morpholine, and others having a boiling point up to and including about 150° F. Preferred volatile nitrogen bases for use in this invention comprise compositions having a vapor pressure at room temperature such that the amine evaporates from the glue line at a rate greater than that of water. Such compounds as they evaporate from the glue line leave the adhesive bond particularly susceptible to aqueous removability. Most preferred base for use in this invention includes ammonia and ammonium hydroxide for reasons of rapid reaction, low cost and ease of volatilization. The use of such volatile amines provides an adhesive that when cured can be resistant to the effects of neutral aqueous solutions but can be rapidly removable in the presence of dilute alkali.

The aqueous adhesives of this invention can contain a dispersion or suspension of gelatinized or ungelatinized starch particles in the aqueous medium and can contain a solution of the neutralized rosin composition. Any unneutralized rosin present in the aqueous composition typically forms a compatible suspension with the starch-based adhesives and acts as a filler. We have additionally found that the viscosity, extent of tackiness, shortness and other adhesive properties of the materials can be varied over broad ranges depending on formulation and additional adhesive components.

The starch and common starch derivatives the adhesives of the invention are commodity chemicals produced from a number of root, stem or fruit, plant sources. Starch can be derivatized by oxidation, or by reacting ring hydroxyls with a variety of reactants. Starch is a high molecular weight polymeric carbohydrate polysaccharide, most commonly composed of six carbon monosaccharide units joined by alpha-glycan linkages (typically 1→4, 1→6, and others) having an approximate molecular formula of $(C_6H_{10}O_5)_n$, wherein n equals $10^2$ to $10^6$. Starch occurs naturally in the form of white granules and comprises linear and branched polysaccharide polymers. Starch is commonly manufactured by first soaking and grinding the plant starch source, and separating the starch from waste matter. The starch is commonly reslurried and processed into a finished dried starch product. Dextrans and other similar polysaccharides which are typically linear polysaccharide ($\alpha-D(1\rightarrow 6)$) polymers, with a molecular weight of from about $10^5$ to $10^8$ can be used in place of starch in the adhesives of the invention. Commercial starch often has the form of a pearl starch, powdered starch, high amylose starch, high amylopectin starch, precooked or gelatinized starch, etc. Preferably waxy starch, having a high amylopectin content, is used in making the adhesives of this invention.

Acidic Resin or Rosin

Resins or rosins that can be used in the aqueous adhesive compositions of the invention include natural and synthetic organic materials that can be small molecules (MW<1,000) or polymer molecules having sufficient carboxylic acid functionality to have an acid number of at least 140. Preferred adhesives contain a wood or hydrocarbon rosin having an acid number of at least 150.

Rosin and wood rosin materials naturally occur in the olioresin of pine trees. Rosin is typically obtained from exudates of living pine trees, aged stumps and as a by-product of kraft paper industry. Rosins and wood rosins are a complex mixture of mainly naturally occurring resin acids and fatty acids in varying proportions. The materials are typically pale yellow to dark red to nearly black with a red tint. Wood rosins are soluble in most organic solvents but are insoluble in water. Rosin can be obtained as an unmodified rosin directly from a natural source or can be hydrogenated, dehydrogenated, polymerized, derivatized or other modification. Wood rosins useful in the invention are typically solid or nearly solid at room temperature. An important property of the wood rosin material is that it preferably forms a melt at boiling water temperatures. Accordingly, such rosins will have a melting point up to and including 110° C. (212° F.). Other wood rosins can be used with higher melting points if pressurized reactors are available to increase the boiling point of the aqueous solutions into which the rosin is incorporated. Additionally, preferred rosins have softening points of from about 70° to 110° C. according to the Hercules drop method, and a saponification number of about 140 to about 170.

Similarly, hydrocarbon rosins having measurable acid numbers can also be used in the aqueous adhesives of the invention. Hydrocarbon rosins are thermoplastic polymers of low molecular weight derived from coal or petroleum sources and from turpentine. The average molecular weights of these resins fall below 2,500 and typically below 2,000. Such hydrocarbon resins typically have softening points between 90° and 140° C. and often come in the form of a flake or solid product.

An important property with respect to the wood and hydrocarbon rosin compositions useful in this invention is the acid number of the material. The acid number of rosin (both hydrocarbon and wood) is expressed as the number of milligrams of potassium hydroxide required to neutralize one gram of sample as determined by A.S.T.M. D-465. The preferred wood and hydrocarbon rosins of this invention contain sufficient carboxylic acid functionality such that the acid number of the rosin is greater than about 140, preferably greater than about 150, and most preferably for reasons of compatibility, low cost and ease of processing, greater than about 170. In particular, high acid number (hydrocarbon rosins) are particularly useful since the neutralization and solubilization of the carboxylic acid containing hydrocarbon rosins is aided by increasing acid number.

Preferred rosins include wood rosin, tall oil rosin, gum rosin and mixtures thereof. Additional information with respect to hydrocarbon resins, rosin and rosin derivatives can be found in the Kirk-Othmer *Encyclopedia of Chemical Technology*. 2nd Edition, Vol. 11, pp. 242-262, and Vol. 17, pp. 475-508.

Preferred rosins for use in the invention include the Staybelite rosin (Hercules Chemical Company) having the following typical properties:

TABLE 1

| Property | Specification Value |
| --- | --- |
| Softening point (Hercules drop method) | 75° C. |
| Acid number | 165 |
| Refractive index at 100° C. | 1.5008 |
| Color | Lovibond 8 amber |
| Saponification number | 167 |
| Unsaponifiable matter | 9.3% |
| Gasoline insoluble mil density at 20° C. | 1.045 |

Polystix 90 (Hercules Chemical Company) consisting principally of abietic-type acids in a dimerized rosin composition. Typical properties of the resin include:

TABLE 2

| Property | Specification Value |
| --- | --- |
| Softening point (Hercules drop method) | 90° C. |
| Acid number minimum | 150 |
| Color | U.S.D.A. Rosin Scale N |
| Gardner 8 | |
| Pounds per gallon at 25° C. | 8.9 |
| Density at 20° C. kilograms per liter | 1.08 |

FORAL AX (Hercules Chemical Company) having typical properties as follows:

TABLE 3

| Property | Specification Value |
| --- | --- |
| Softening point (Hercules drop method) (minimum) | 74° C. |
| Acid number minimum | 158 |
| Refractive index of 100° C. (maximum) | 1.497° C. |
| Abitic acid, UV% (maximum) | 0.2 |

The adhesive compositions of the invention can include a variety of other ingredients and additives including diluents, inorganic extenders, perfumes, dyes, reinforcing resins, fibers, etc. For example, the adhesive composition of the present invention may include clay thickeners in an amount ranging from about 0.1 to 5 wt-% of the total composition.

Virtually any commonly available label can be used with the adhesive compositions of the invention. Labels typically are prepared from thin sheet-like materials and can be made from a variety of materials including paper, polymer films, foil, metallized films, polyester film or sheets polystyrene foam woven and nonwoven fabrics, and other sheet-like materials. Preferably labels formed of paper, polymer films or metallized polymers are used.

In somewhat greater detail, the adhesive compositions of this invention are typically made by combining water, starch, strong base and the acidic resin composition into a uniform dispersed aqueous blend. While a variety of addition sequences can be used, a preferred method for forming the adhesive composition of this invention involves initially forming a starch slurry in water at room temperature or elevated temperature. The starch is agitated in the water solution until fully wetted (and into the starch solution can be added other functional water soluble or suspendable materials such as urea, dicyandiamide, clays, and others until the mixture is smooth and uniform.) Into this aqueous dispersion is then placed the acidic resin which is typically added at a temperature at or near its softening point to form a dispersion of the melted resin in the aqueous solution. Alternatively, the adhesive preparative mixture can be heated after rosin addition to the softening point of the resin to promote neutralization and solubilization. Mixing is continued and into the aqueous dispersion is added the strong base composition in sufficient amount to fully neutralize and solubilize the dispersed melted acidic resin particles. Agitation is continued until the neutralization reaction is complete. After completion, the adhesive is stable and will not settle or stratify. At this point a variety of additives including dyes, preservatives, antioxidants, perfumes, etc. can be added to the fully formulated adhesive.

The following chart details the useful, preferred, and most preferred formula for the adhesives of the invention and for concentrates that can be used in the manufacture of the adhesive.

TABLE 4

| Preferred Ingredient | Useful (Wt-%) | Preferred (Wt-%) | Most (Wt-%) |
| --- | --- | --- | --- |
| Starch | 5–50 | 10–40 | 25–35 |
| Neutralized acidic resin | 2–35 | 5–25 | 10–20 |
| Strong base* | pH >7 | pH >8 | pH >8 |
| Clay | 0–30 | 0.1–5 | 0.2–1.5 |
| Boric acid compound | 0–0.5 | 0.01–0.4 | 0.1–0.3 |
| Urea or DICI | 0–20 | 2–18 | 5–15 |
| Water | Balance | Balance | Balance |

*sufficient base to result in the pH shown in the Table

The above specification and tables provide a detailed discussion of the adhesive components and the manner of making and using the fully formulated adhesive. The above discussion is further illuminated in the following Examples which contain a best mode.

EXAMPLE I

Into an industrial mixer equipped with a steam jacket, addition ports and a blade mixer is added 35 parts of water and at high agitation 0.5 parts of a hectorite clay. The clay suspension was stirred until uniform at high speed and into the uniform dispersion is placed 5.0 parts of urea, 2.0 parts of dicyandiamide, 26 parts of starch (a waxy starch having approximately 90% amylopectin), and 21 parts of an aqueous ethylene acrylic acid copolymer (Rhoplex LC-40) having a solids content of about 54 to 56 wt-%, an aqueous viscosity of 500 to 900 cP, a pH of 4.4 to 5, a milky white appearance. The mixer is agitated until the contents are smooth. Into the agitated aqueous mixture is placed 6 parts of an acidic resin (Staybelite resin, Hercules Chemical), 0.5 parts of an anti-foam agent and 1.0 parts of aqueous 28 wt-% ammonium hydroxide. The mixer is heated to a temperature of 190°–200° F. for 20 minutes until the ammonia has fully neutralized the acidic resin. After neutralization the mixture is cooled to 120° F. and into the mixture is placed 0.2 parts of a preservative, 2,2'-methylene-bis-(4-chlorophenol) (Cuniphen 2778-I), 0.2 parts of a 1 wt-% aqueous sodium tetraborate pentahydrate solution ($Na_2B_4O_7 \cdot 5H_2O$, United States Borax Chemical Corp.) and sufficient water to adjust the mixture to 50±2 wt-% solids.

The viscosity of the fully formulated adhesive is 72,000–75,000 cP using a Brookfield viscometer RVF, spindle No. 7, 20 r.p.m. at 85° F. and a pH of about 8.

EXAMPLE II

Into an industrial mixer equipped with a blade mixer, steam jacket and addition ports is placed 40 parts of water and 0.5 parts of a hectorite clay. The contents of the mixer were mixed at high speed until a uniform suspension was formed. Into the suspension was placed 30 parts of starch (waxy or high amylopectin starch, A. E. Staley Company), 6 parts urea, 2 parts dicyandiamide, 0.3 parts of an anti-foam agent, and 15 parts of an acidic resin (Polystix 90, Hercules Chemical Co.). The mixer was operated until a smooth dispersion was formed. Into the smooth dispersion was added slowly over a 15 minute period a pre-mix of about 4 parts of cold water and 1.0 parts of sodium hydroxide bead at room temperature. The mixture is agitated at room temperature for 15 minutes. The jacket temperature is raised slowly to 185°–195° F. and held for 10 minutes to promote the reaction between sodium hydroxide and the acidic resin. After a 20 minute reaction time, the contents of the mixer is cooled to 100° F. and into the mixture is added a preservative 2,2'-methylene-bis-(4-chlorophenol) (Cuniphen 2778-I) and sufficient water to adjust the aqueous adhesive to approximately 50±2 wt-% solids.

The adhesive had a pH of 8.5 and a viscosity of between 75,000 and 80,000 cP using a Brookfield RVF viscometer, spindle No. 7, 20 r.p.m., at 85° F.

EXAMPLE III

Into an industrial mixer equipped with a steam jacket, blade mixer and addition ports was added 40 parts of water and 0.3 parts of a hectorite clay. The mixer was operated and a smooth dispersion was obtained. Into the dispersion under stirring was added 30 parts of starch (waxy starch, high amylopectin content, A. Staley Company), 6.0 parts urea, 2.0 parts dicyandiamide, 0.3 parts of an anti-foam agent, 15.0 parts of an acidic resin (Polystix 90, Hercules Chemical), and 2.5 parts of aqueous 28 wt-% ammonium hydroxide. The mixture was agitated at room temperature for 10 minutes and the steam jacket was used to heat the mixture to 185°–195° F. and the temperature was maintained for 20 minutes to promote the reaction between the ammonium hydroxide and the acidic resin. At the end of the 20 minute period, the mixture was cooled to 120° F. and into the mixture was added 0.1 parts of 2,2'-methylene-bis-(4chlorophenol) (Cuniphen 2778-I) and sufficient water to adjust the adhesive to about 49±2 wt-% solids.

The adhesive had a pH of 8.5 and a viscosity of about 60,000 cP using a Brookfield RVF viscometer, No. 7 spindle, 20 r.p.m. at 85° F.

EXAMPLE IV

Into an upper portion of a kitchen double boiler having an internal volume of about 800 milliliters equipped with an air driven mechanical stirrer and a hot plate heater was added 40 grams of water and 0.5 parts of a hectorite clay. The mixture was agitated with the mechanical stirrer until uniform and into the double boiler was added 30 parts of starch (waxy starch, high amylopectin content, A. Staley Company), 6 grams urea, 2.0 grams of dicyandiamide, 0.3 parts of an antifoam, 15 parts of an acidic resin (Polystix 90, Hercules Chemical), 2.8 grams aqueous 28 wt-% ammonium hydroxide, and 0.1 part of Irganox 1076, a preservative. The contents of the container were mixed at room temperature for 10 minutes and then heated to 185°–195° F. and agitated for 20 minutes. After the agitation period the mixture was cooled to 120° F. and into the mixture was added 0.1 part of a preservative and 3.3 parts of water to adjust the adhesive to about 50 wt-% solids. The adhesive had a viscosity of 85,000 cP using a Brookfield VHF viscometer, No. 7 spindle, 20 r.p.m. at 85° F.

EXAMPLE V

Example IV was repeated exactly except that instead of 2.8 parts of aqueous 28 wt-% ammonium hydroxide, a pre-mix of 3.80 grams of water and 0.95 grams of sodium hydroxide were used in the adhesive preparation. The resulting adhesive had a viscosity of 98,000 cP using a Brookfield VHF viscometer, No. 7 spindle, 20 r.p.m. at 85° F. and a pH of 8.4.

EXAMPLE VI

Into a kitchen double boiler having an internal volume of 800 millimeters equipped with an air driven mechanical stirrer and a hot plate was added 40 grams of water. The stirrer was operated and into the stirred water was added 2.0 grams of dicyandiamide, 6 grams of urea, 0.3 grams of an anti-foam, 35 grams of starch (waxy, high amylopectin content, A. E. Staley Company), 15 grams of an acidic resin (Polystix 90, Hercules Chemical), and 2.80 grams of aqueous 28 wt-% ammonium hydroxide. The mixture was agitated cold for 10 minutes and then slowly heated to 185°-195° F. for 20 minutes to promote the reaction between the ammonium hydroxide and the acidic resin. After reaction, the mixture was cooled to 120° F. and 0.1 part of a preservative was added along with 3.5 grams of water to adjust the material to approximately 50 wt-% solids. The pH of the mixture was about 8.4 and had a viscosity of 60,000 cP using a Brookfield VHF viscometer at No. 7 spindle, 20 r.p.m. at 85° F.

Ice Proof Test

Bottles were labeled with the starch neutralized rosin adhesives of Examples I and IV and with traditional casein-based adhesive formulations. The labeled bottles were permitted to dry for one week at room temperature and then immersed in ice water and stored in a refrigerator at 37° F. After 24 hours of soaking, the labels glued with one traditional casein adhesive became detached. The remaining labels became detached after 48 hours of contact with the ice bath at 37° F. The starch neutralized rosin adhesives had significant glue residue remaining on the bottle glass surfaces. This experiment indicates that the starch neutralized rosin products of this invention have a water resistance that is at least as good as and in certain cases better than that of traditional casein-based label adhesives.

Alkali Removability Test

The bottles labeled identically to that in the ice proof test after one week of drying at room temperature were immersed in a 3.0 wt-% aqueous sodium hydroxide solution at 140° F. and rotated. The experiment is designed to simulate label removal during bottle cleaning in a bottling plant. The starch neutralized rosin adhesives of the invention washed off as quickly or more quickly than the traditional casein-based adhesives.

The above discussion, Examples, and experimental results provide a detailed description of the invention. However, since many embodiments of the invention can be made without departing from the spirit and scope of the invention, the invention resides in the claims hereinafter appended.

We claim:

1. A method of adhering a label to a container which comprises:
   (a) forming an adhesive layer on a flexible label, said adhesive comprising:
      (i) a major proportion of water;
      (ii) an effective amount of a starch to form an adhesive bond; and
      (iii) an effective cleaning facilitating amount of a neutralization product of an alkali metal base and a wood or a hydrocarbon rosin composition having an acid number greater than about 140; and
   (b) adhering the label to a beverage container through the adhesive layer.

2. The method of claim 1 wherein the alkali metal base comprises sodium hydroxide, potassium hydroxide or mixtures thereof.

3. The method of claim 1 wherein the rosin comprises a solid having a molecular weight of less than 2,000, a softening point of from about 70° to 110° C.

4. The method of claim 1 wherein the neutralization product of the strong base and the rosin composition is present in the adhesive composition at about 2 to 35 wt-%.

5. The method of claim 1 wherein the rosin comprises wood rosin and the neutralization product is present in the aqueous adhesive composition at about 5 to 25 wt-%.

6. The method of claim 1 wherein the starch is present as a gelatinized starch in the aqueous adhesive composition at a concentration of about 5 to 50 wt-%.

7. The method of claim 1 wherein the starch is present in the adhesive composition at 5 to 50 wt-%.

8. The method of claim 1 wherein the adhesive additionally contains from about 2 to 18 wt-% of a nitrogen compound selected from the group consisting of urea, dicyandiamide, or mixtures thereof based on the aqueous adhesive composition.

9. The method of claim 1 wherein the adhesive additionally contains about 0.1 to 0.3 wt-% of borax.

10. The method of claim 1 wherein the adhesive composition additionally contains about 0.1 to 0.5 wt-% of a clay thickener.

11. The method of claim 1 wherein the label comprises a paper label, a foil label, a polystyrene foam label, or a polymer film.

12. A method of adhering labels to containers which comprises:
   (a) forming an adhesive layer on a flexible label, said adhesive comprising:
      (i) a major proportion of water;
      (ii) an effective amount of starch to form an adhesive bond; and
      (iii) an effective water resistance increasing amount of a neutralization product of a volatile nitrogen base and a wood or a hydrocarbon rosin composition having an acid number greater than about 140; and
   (b) adhering the label to a beverage container through the adhesive layer.

13. The method of claim 12 wherein the volatile nitrogen base comprises ammonia hydroxide or ammonium gas.

14. The method of claim 12 wherein the rosin comprises a solid having a molecular weight of less than 2,000, a softening point of from about 70° to 110° C.

15. The method of claim 12 wherein the rosin comprises a solid having a molecular weight of less than 2,000, a softening point of from about 70° to 110° C.

16. The method of claim 12 wherein the neutralization product of the strong base and the rosin composition is present in the adhesive composition at about 2 to 35 wt-%.

17. The method of claim 12 wherein the rosin comprises wood rosin and the neutralization product is present in the aqueous adhesive composition at about 5 to 25 wt-%.

18. The method of claim 12 wherein the starch is present in the aqueous adhesive composition at a concentration of about 5 to 50 wt-%.

19. The method of claim 12 wherein the starch is nongelatinized and is present in the adhesive composition at 5 to 50 wt-%.

20. The method of claim 12 wherein the adhesive additionally contains from about 2 to 18 wt-% of a nitrogen compound selected from the group consisting of urea, dicyandiamide, or mixtures thereof based on the aqueous adhesive composition.

21. The method of claim 12 wherein the adhesive additionally contains about 0.1 to 0.3 wt-% of borax.

22. The method of claim 12 wherein the adhesive composition additionally contains about 0.1 to 5 wt-% of a clay thickener.

23. The method of claim 12 wherein the label comprises a paper label, a foil label, a polystyrene foam label, or a plastic label.

* * * * *

UNITED STATES PATENT AND TRADEMARK OFFICE
CERTIFICATE OF CORRECTION

PATENT NO. : 4,964,939

DATED : October 23, 1990

INVENTOR(S) : Patrick D. Gleason

It is certified that error appears in the above-identified patent and that said Letters Patent is hereby corrected as shown below:

In Column 10, line 61, "ammonia" should read --ammonium--.

In Column 10, lines 61 and 62, "ammonium" should read --ammonia--.

Signed and Sealed this

Fifth Day of May, 1992

Attest:

DOUGLAS B. COMER

*Attesting Officer*  *Acting Commissioner of Patents and Trademarks*